Sept. 13, 1949.  J. M. AUZIN  2,481,488
METHOD OF MAKING INFLATABLE CATHETERS
HAVING PREFORMED BALLOON SACS
Filed Oct. 19, 1946  2 Sheets-Sheet 1
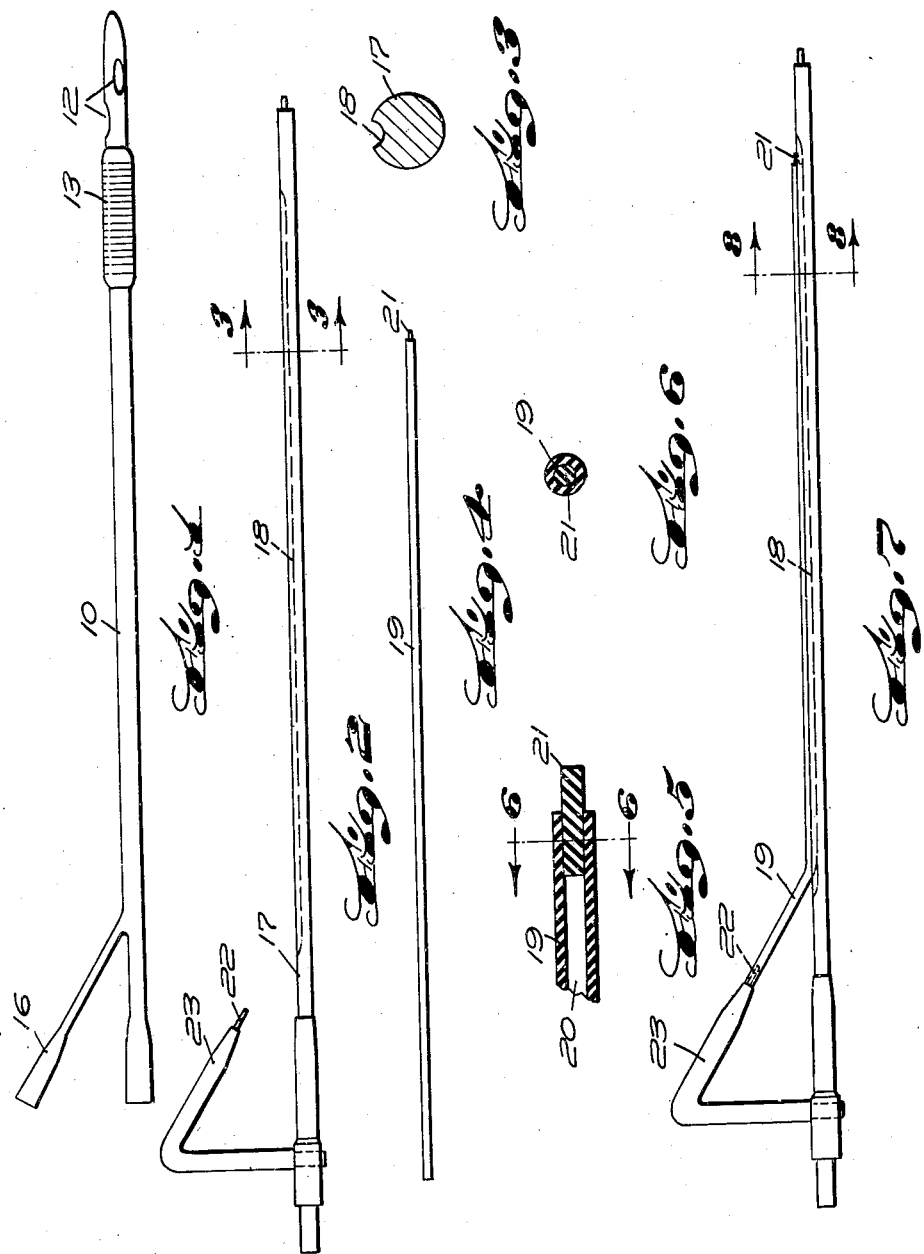
INVENTOR.
John M. Auzin
BY Nathaniel Frucht
Attorney

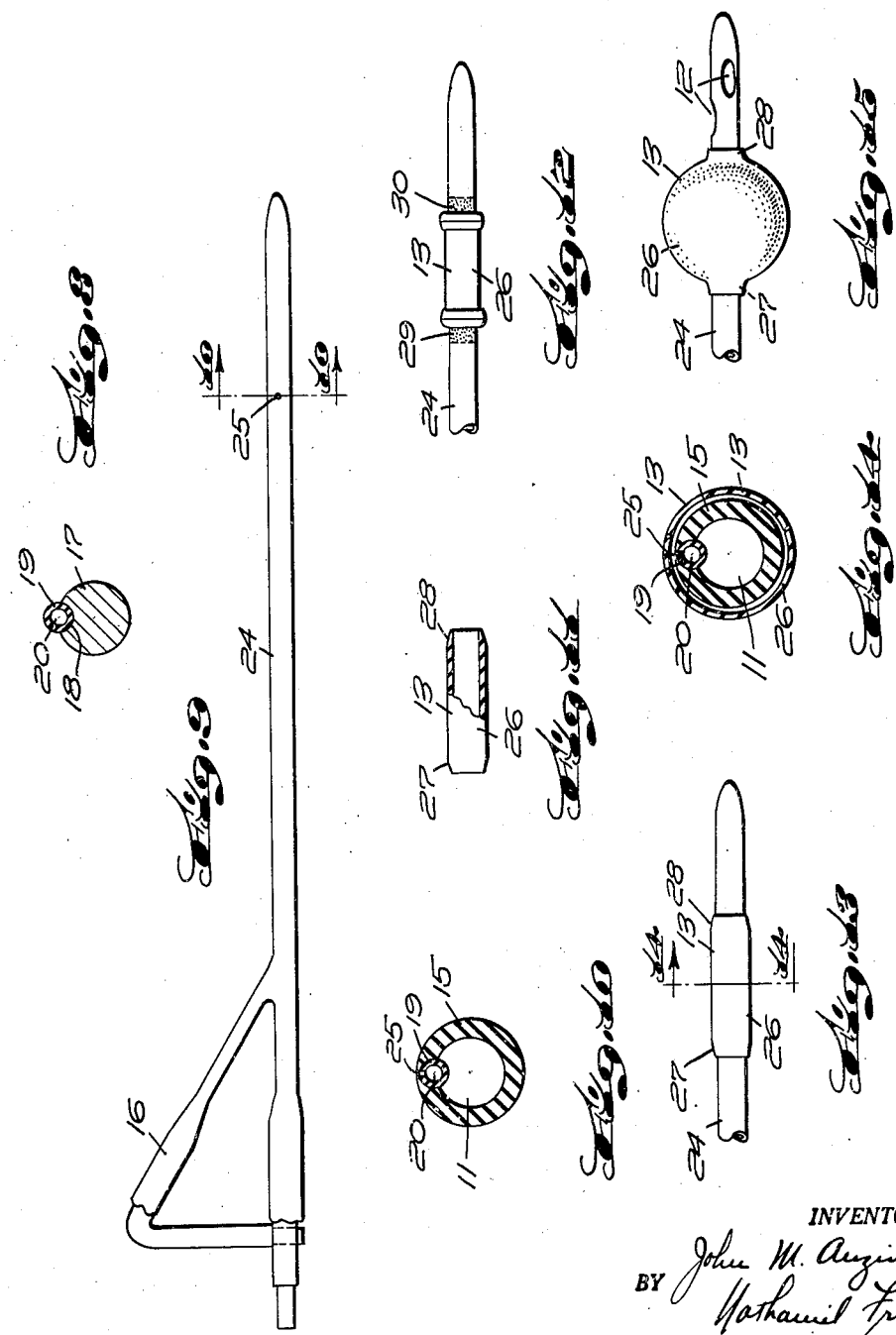

Patented Sept. 13, 1949

2,481,488

UNITED STATES PATENT OFFICE 2,481,488

METHOD OF MAKING INFLATABLE CATHETERS HAVING PREFORMED BALLOON SACS

John M. Auzin, Warwick, R. I., assignor to Davol Rubber Company, a corporation of Rhode Island Application October 19, 1946, Serial No. 704,511

7 Claims. (Cl. 18—58.7)

This application is a continuation in part of application Serial No. 606,258, filed July 20, 1945, for Manufacture of inflatable catheters.

The present invention relates to the manufacture of catheters, and has particular reference to the manufacture of catheters having inflatable balloons.

The principal object of the invention is to provide an inflatable catheter having a body portion of circular cross-section.

Another object of the invention is to utilize preformed balloon sacs which are integrally secured to a catheter body portion.

A further object is to eliminate joining ridges or edges in integrally securing pre-formed balloon sacs to a catheter body portion.

With the above and other objects and advantageous features in view, the invention consists of a novel arrangement of parts more fully disclosed in the following detailed description of a preferred method of manufacture, in conjunction with the accompanying drawings, and more specifically defined in the claims appended thereto.

In the drawings:

Fig. 1 is a plan view of a catheter made in accordance with the invention;

Fig. 2 is an enlarged view of the form for dipping the catheter body;

Fig. 3 is an enlarged section on the line 3—3 of Fig. 2;

Fig. 4 is a longitudinal view of the pre-formed inflation tube;

Fig. 5 is an enlarged detail showing the distal end of the inflation tube after plugging;

Fig. 6 is a section on the line 6—6 of Fig. 5;

Fig. 7 is a view showing the positioning of the plugged inflation tube on the form of Fig. 2;

Fig. 8 is a section on the line 8—8 of Fig. 7;

Fig. 9 is a view of the assembly of Fig. 7, after dipping to obtain a body coating and forming an opening through the coating to the inflation tube, the opening for the balloon sac being shown on the side for clearness;

Fig. 10 is a section on the line 10—10 of Fig. 9, showing the circular outer surface of the catheter body;

Fig. 11 is a view showing the pre-formed balloon sac, partly in section;

Fig. 12 is a view showing the balloon sac positioned on the distal end of the catheter body, the ends of the balloon sac being turned back for removal of the wetting agent from the turned back balloon ends and the contiguous body areas;

Fig. 13 is a view similar to Fig. 12, the balloon ends being rolled over after the application of cement to the turned back sac ends and the contiguous body areas;

Fig. 14 is an enlarged section on the line 14—14 of Fig. 13; and

Fig. 15 is a detail showing the balloon inflated.

It has been found desirable to provide a catheter of the inflatable type with a body portion having a circular cross-section and no ridges or abrupt edges, and to manufacture the catheter so as to eliminate rejects due to imperfect parts, by pre-forming the parts, thus permitting testing of each part, the parts being integrally joined to form a unitary article.

To this end, I provide an inspected pre-formed inflation tube, which is inserted in a catheter body form, and then dip the assembly in a solution of natural or synthetic rubber to obtain a dipped catheter body of circular cross-section; I then mount a tested pre-formed balloon sac which has finely tapered ends on the catheter body and secure the parts in place, the assembled parts then being leached and cured to integrally join.

Referring to the drawings, the improved catheter 10 has a longitudinal flow passageway 11, see Fig. 14, with flow ports or eyes 12 leading to the flow passageway; a balloon sac 13 is provided at the distal end which is inflatable through an inflation channel 14 in the wall 15 of the catheter body, an inflation conduit 16 at the other end of the catheter being in free communication with the inflation channel.

The catheter is preferably formed by dipping a suitable form 17, see Fig. 2, in natural or synthetic rubber solution, the form being preferably of metal of circular cross-section and having a longitudinal semi-circular groove 18 therein. A pre-formed rubber tubing 19 of very small diameter, which has been inspected and tested, is cut to the proper length to fit within the groove 18, and has a channel 20 therethrough which subsequently serves as the balloon inflation channel. The length of tubing 19 is plugged at one end, as shown in Figs. 5 and 6, with a small rubber plug 21, and the tubing is coated with a rubber cement. Both ends of the groove are now coated with rubber-to-metal bonding agent and the coated tubing is placed in the groove with the plugged end at the distal end of the form and pressed down into the bonding agent at each end of the groove to obtain adhering; the rear end of the tubing is then placed on the holding pin 22 of the form.

The metal form with the attached tubing are now dipped in the rubber solution; since the tubing is practically free in the bare metal groove, the rubber solution, preferably latex, runs around the tubing within the groove and embeds the tubing within the catheter body wall and also fills in the space between the tubing and the outer circumference of the form 18 so as to form a tubular catheter body 24, see Fig. 10, having a circular outer periphery. As the dipped article dries, the outside layer dries first and exerts a tension on the embedded tubing which presses it down in the groove. An opening or port 25 is now burned through the wall of the embedded tubing, for example, with a heated small diameter rod, in the distal end of the catheter body, as illustrated in Fig. 9, and the opening is cleaned with naphtha.

A pre-formed tubular balloon sac 26, see Fig. 11, which has been inspected and tested and is of the proper length, is now mounted on the catheter body over the opening 25, the catheter body and the balloon sac being first treated with a wetting agent of standard type, such as Aquarex D, in order to permit ready sliding of the balloon sac on the catheter body. The ends 27, 28 of the pre-formed tubular balloon sac 26 are preferably finely tapered as illustrated. If desired, additional wetting agent is now placed on the mounted sac; both ends of the sac are then rolled back as illustrated in Fig. 12, and the wetting agent is removed from the contiguous areas 29, 30 of the catheter body as well as the sac, by washing with water or by cleaning with naphtha. Cement is now applied over the areas 29, 30, and the sac ends are then rolled back to cover the now cemented areas 29, 30, any excess cement being removed with naphtha. The assembly is now partially leached and stripped from the form; the catheter is then thoroughly leached, the eyes 12 are burned in, and the catheter is dried and cured.

The improved manufacture thus provides an inflatable catheter which is integral and has a circular body, the catheter having an embedded inflation channel tubing and a pre-formed balloon sac which have passed through inspection and testing, thus eliminating rejects due to faulty inflation channels or faulty balloons. The pre-formed balloon sac has tapered ends, thus eliminating joining ridges or edges, whereby the completed inflatable catheter is exceptionally easy to insert into a body cavity, with a minimum of pain or discomfort to the patient.

While I have described a specific manufacturing procedure, it is obvious that changes in the arrangement and the relative relation and mounting of the parts may be made to meet requirements for different catheter sizes and designs, without departing from the spirit or the scope of the invention, as defined in the appended claims.

I claim:

1. In a method of forming an inflatable catheter having a cylindrical body portion, the steps of positioning a pre-formed inflation tube in a longitudinal surface groove of a dipping form, plugging the distal end of the inflation tube, dipping the form in rubber solution to obtain a body portion coating, forming an opening in the coating into the inflation tube, applying wetting agent to the coating in the region of the opening, positioning a pre-formed balloon sac having tapered ends over the opening, rolling back the ends of the balloon sac, removing the wetting agent from the catheter body rolled back areas, applying cement to the catheter body at the rolled back areas, rolling the ends of the balloon sac back over the applied cement, and drying and curing to obtain an integral catheter.

2. In a method of forming an inflatable catheter having a cylindrical body portion, the steps of positioning a pre-formed inflation tube in a longitudinal surface groove of a dipping form, plugging the distal end of the inflation tube, dipping the form in rubber solution to obtain a body portion coating, forming an opening in the coating into the inflation tube, applying wetting agent to the coating in the region of the opening, positioning a pre-formed balloon sac having tapered ends over the opening, rolling back the ends of the balloon sac, removing the wetting agent from the catheter body rolled back areas, applying cement to the catheter body at the rolled back areas and the rolled back balloon sac ends, rolling the ends of the balloon sac back over the applied cement, and drying and curing to obtain an integral catheter.

3. In a method of forming an inflatable catheter having a cylindrical body portion, the steps of positioning a pre-formed inflation tube in a longitudinal surface groove of a dipping form, plugging the distal end of the inflation tube, cementing the ends of the inflation tube to the groove, dipping the form in rubber solution to obtain a body portion coating, burning an opening in the coating into the inflation tube, applying wetting agent to the coating in the region of the opening, cleaning the opening, positioning a pre-formed balloon sac having tapered ends over the opening, rolling back the ends of the balloon sac, removing the wetting agent from the catheter body rolled back areas, applying cement to the catheter body at the rolled back areas, rolling the ends of the ballon sac back over the applied cement, and drying and curing to obtain an integral catheter.

4. In a method of forming an inflatable catheter having a cylindrical body portion, the steps of positioning a pre-formed inflation tube in a longitudinal surface groove of a dipping form, plugging the distal end of the inflation tube, coating the inflation tube with rubber cement, drying the cement, cementing the ends of the inflation tube to the groove, dipping the form in rubber solution to obtain a body portion coating, burning an opening in the coating into the inflation tube over the opening, applying wetting agent to the coating in the region of the opening, cleaning the opening, rolling back the ends of the balloon sac, removing the wetting agent from the catheter body rolled back areas, applying cement to the catheter body at the rolled back areas, and the rolled back balloon sac ends, rolling the ends of the balloon sac back over the applied cement, and drying and curing to obtain an integral catheter.

5. In a method of forming an inflatable catheter having a cylindrical body portion, the steps of coating both ends of a longitudinal surface groove in a metal dipping form with rubber-to-metal bonding agent, positioning a pre-formed inflation tube in the groove and adhering its ends in the ends of the form groove, the remainder of the tube seating freely in the groove, and dipping the form and the adhered tube in rubber solution to obtain a body portion coating having the tube embedded in the wall thereof.

6. In a method of forming an inflatable catheter having a cylindrical body portion, the steps of coating both ends of a longitudinal surface groove in a metal dipping form with rubber-to-metal bonding agent, positioning a pre-formed inflation tube in the groove and adhering its ends in the ends of the form groove, the remainder of the tube seating freely in the groove, dipping the form and the adhered tube in rubber solution to obtain a body portion coating having the tube embedded in the wall thereof, forming an opening in the coating into the inflation tube, mounting a pre-formed balloon sac over the opening and adhering its ends to the body portion coating, and drying and curing to obtain an integral catheter.

7. In a method of forming an inflatable catheter having a cylindrical body portion, the steps of coating both ends of a longitudinal surface groove in a metal dipping form with rubber-to-metal bonding agent, positioning a pre-formed inflation tube in the groove and adhering its ends in the ends of the form groove, the remainder of the tube seating freely in the groove, dipping the form and the adhered tube in rubber solution to obtain a body portion coating having the tube embedded in the wall thereof, forming an opening in the coating into the inflation tube, mounting a pre-formed balloon sac having tapered ends over the opening and adhering its ends to the body portion coating, and drying and curing to obtain an integral catheter.

JOHN M. AUZIN.

REFERENCES CITED

The following references are of record in the file of this patent:

UNITED STATES PATENTS

| Number | Name | Date |
| --- | --- | --- |
| 2,308,484 | Auzin et al. | Jan. 19, 1943 |
| 2,314,262 | Winder | Mar. 16, 1943 |
| 2,330,399 | Winder | Sept. 28, 1943 |
| 2,330,400 | Winder | Sept. 28, 1943 |